United States Patent
Tamai et al.

[11] Patent Number: 5,585,994
[45] Date of Patent: Dec. 17, 1996

[54] BATTERY OVER-CURRENT PROTECTION CIRCUIT

[75] Inventors: Mikitaka Tamai, Sumoto; Takaharu Ohira, Komatsushima; Tetsuya Okada, Sumoto, all of Japan

[73] Assignee: Sanyo Electric Co., Ltd., Osaka, Japan

[21] Appl. No.: 181,410

[22] Filed: Jan. 13, 1994

[30] Foreign Application Priority Data

| Jan. 22, 1993 | [JP] | Japan | 5-009256 |
| Apr. 9, 1993 | [JP] | Japan | 5-083342 |
| Jun. 11, 1993 | [JP] | Japan | 5-140691 |

[51] Int. Cl.$^6$ ..................................... H02H 3/00
[52] U.S. Cl. ................... 361/98; 361/58; 361/59; 361/75; 323/277
[58] Field of Search .................... 361/88–89, 93–94, 361/98, 100–101, 54–59, 3, 13, 5–10, 54–60, 71–75; 307/130–131; 323/275–277, 279

[56] References Cited

U.S. PATENT DOCUMENTS

| 4,019,096 | 4/1977 | Bullinga | 361/86 |
| 4,363,064 | 12/1982 | Billings et al. | 361/57 |
| 4,528,608 | 7/1985 | Andersson et al. | 361/18 |

FOREIGN PATENT DOCUMENTS 63-158744  7/1988  Japan.

*Primary Examiner*—Jeffrey A. Gaffin
*Assistant Examiner*—Michael J. Sherry
*Attorney, Agent, or Firm*—Wenderoth, Lind & Ponack

[57] ABSTRACT

A first series circuit of a current detector and a first switch is connected in series with a battery, and a second series circuit of a resistor and a second switch is connected in parallel with the first series circuit. A control device controls an on and off state of the first and second switches to provide over-current protection of the battery. In particular, the control device turns off the first switch to cut-off battery over-current and turns on the second switch when the battery current exceeds a specified level as detected by the current detector. Then, after the battery current, which flows through the second series current, drops below the specified level, the first switch is returned to an on state to again allow battery discharge.

7 Claims, 7 Drawing Sheets

BATTERY OVER-CURRENT PROTECTION CIRCUIT

BACKGROUND OF THE INVENTION

This invention relates to a circuit to protect batteries from over-current. When a non-rechargeable battery, which can only be discharged, or a rechargeable battery, which can be charged or discharged, is discharged (or charged for the case of a rechargeable battery) with a current in excess of that specified ("over-current"), the battery heats up, performance drops, and life-time is degraded.

As recited in Japanese Non-examined Patent Publication No. 63-158744 published Jul. 11, 1988, over-current protection circuits utilizing breakers and PTC devices (devices which increase resistance due to Joule heating) have been developed to prevent over-current discharge of batteries.

Unfortunately, an over-current protection circuit using breakers or PTC devices cannot prevent over-current discharge in a desirable manner. For example, in an over-current protection circuit using a PTC device, some time is required for the resistance of the PTC device to increase due to over-current. Therefore, during the time required for the resistance of the PTC device to increase, the battery has already discharged with excessive current. It is thus the first object of the present invention to overcome this drawback and protect a battery against over-current discharge and/or charge.

An over-current protection circuit, provided with elements such as semiconductor switches for quickly interrupting discharge when over-current is detected, can cut-off a switch as soon as battery discharge current above the specified value is detected.

This type of over-current protection circuit can immediately cut-off a switch to reliably suppress battery heating due to over-current. However, this type of circuit has the following problem. Namely, when the battery is connected to electrical equipment and the electrical equipment power switch is turned on, a starting surge of in-rush current greater than that for normal operation flows for an instant. Consequently, an over-current protection circuit, that immediately cuts off battery discharge when a current over the specified value is detected, will also cut-off due to starting surge. An over-current protection circuit with the over-current specification increased to avoid cut-off at the starting surge cannot safely protect the battery from over-current discharge. It is thus the second object of the present invention to provide an over-current protection circuit that can appropriately protect a battery from over-current without faulty operation caused by large starting surge currents.

An over-current protection circuit with semiconductor switches to quickly cut-off discharge when over-current is detected, can immediately cut-off a switch to reliably suppress battery heating when battery discharge current is detected above the specified value. For example, over-current discharge can be effectively prevented even in the case of a momentary short circuit. However, when the momentary battery short circuit and over-current condition is relieved, it is necessary for the cut-off switch to be returned to a condition allowing suitable discharge. It is thus the third object of the present invention to provide an over-current protection circuit that can reliably prevent battery over-current, as well as immediately return to a state allowing discharge after the over-current condition has been relieved.

SUMMARY OF THE INVENTION

The battery over-current protection circuit of this invention comprises a battery, a current detection means and first switching means connected in series with the battery, a resistor and second switching means connected in parallel with the current detection means and first switching means, and a control means to turn the first and second switching means on and off.

When battery current exceeds the specified current, the control means turns the first switching means off and the second switching means on. When battery current drops below the specified current, the control means turns the first switching means on.

DETAILED DESCRIPTION OF THE INVENTION

Over-current charge and/or discharge is prevented by the over-current protection circuit of the present invention by turning the first switching means off and the second switching means on to reduce battery current with a resistor when that current exceeds the specified value. When battery current drops below the specified value, the first switching means is turned on for normal charge and/or discharge.

Figure 1:
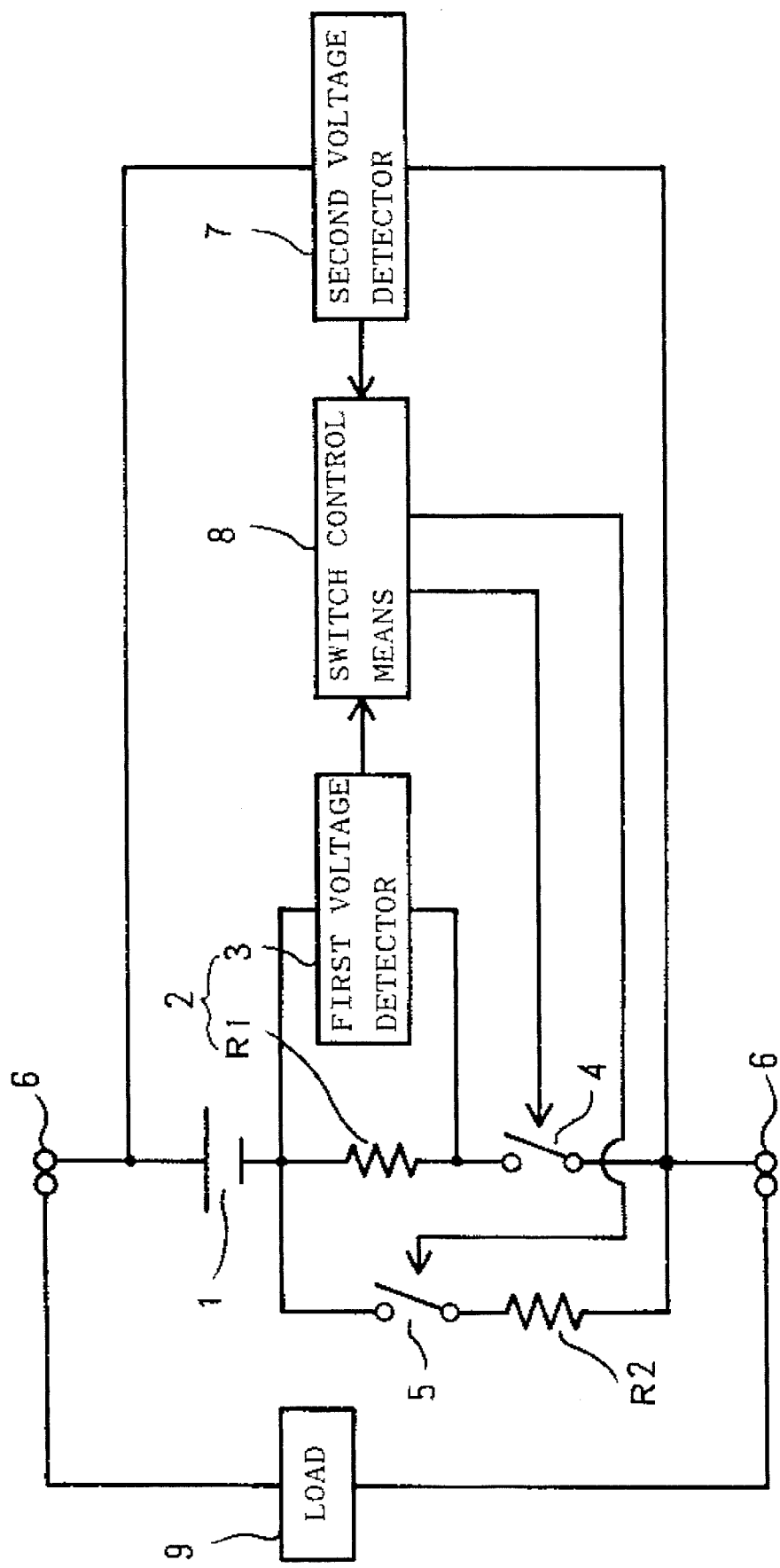
FIG. 1 is a circuit diagram showing a battery over-current protection circuit of the present invention.

FIG. 1 is a circuit diagram of an over-current protection circuit for the first embodiment of the present invention applied to the case of a rechargeable battery. In this figure, 1 is a rechargeable battery such as a lithium ion rechargeable battery, 2 is a current detection means connected in series with the rechargeable battery 1 and comprising a low valued (for example, 100 mΩ) resistor R1 and a first voltage detector 3 to measure the voltage across R1, 4 is the first switching means connected in series with resistor R1, 5 is the second switching means connected in parallel with the series connection of resistor R1 and the first switching means 4, and R2 is a high valued (for example, 100 KΩ) second resistor connected in series with the second switching means 5 and in parallel with the series combination of resistor R1 and the first switching means 4.

The first and second switching means 4, 5 can be Metal Oxide Semiconductor Field Effect Transistors (MOSFET's). In this case, the internal resistance of the MOSFET can also be used as resistor R1. There is no need to provide a separate resistor R1 in a circuit using the internal resistance of the MOSFET as R1, and the first voltage detector 3 is connected to measure the voltage across the MOSFET terminals (drain and source).

Finally, 6 are discharge terminals comprising the positive terminal of the rechargeable battery 1 and one terminal of the first switching means 4, 7 is a second voltage detector to measure the voltage across the discharge terminals 6, 8 is a switch control means to turn the first and second switching means 4, 5 on and off based on measurements from the first and second voltage detectors 3, 7, and 9 is the load connected to the discharge terminals 6 of the rechargeable battery 1.

This over-current protection circuit has the load 9 connected to its discharge terminals 6. When the rechargeable battery 1 is being discharged, the first switching means 4 is turned on and the second switching means 5 is turned off. The discharge current of the rechargeable battery 1 is monitored by the first voltage detector 3 measuring voltage across resistor R1.

Now if a low resistance load 9 (or a short circuit) is connected to the discharge terminals 6 and if the discharge current of the rechargeable battery 1 exceeds 5 A, the first voltage detector 3 will detect that. In other words if the voltage across the terminals of R1 exceeds 0.5 V, the first voltage detector 3 outputs a detection signal. This detection signal is input to the switch control means 8. Based on the detection signal, the switch control means 8 turns the first switching means 4 off and the second switching means 5 on. By doing this, the discharge current of the rechargeable battery 1 is limited to an extremely small value by resistor R2, and the battery 1 is protected against over-current.

Figure 2:
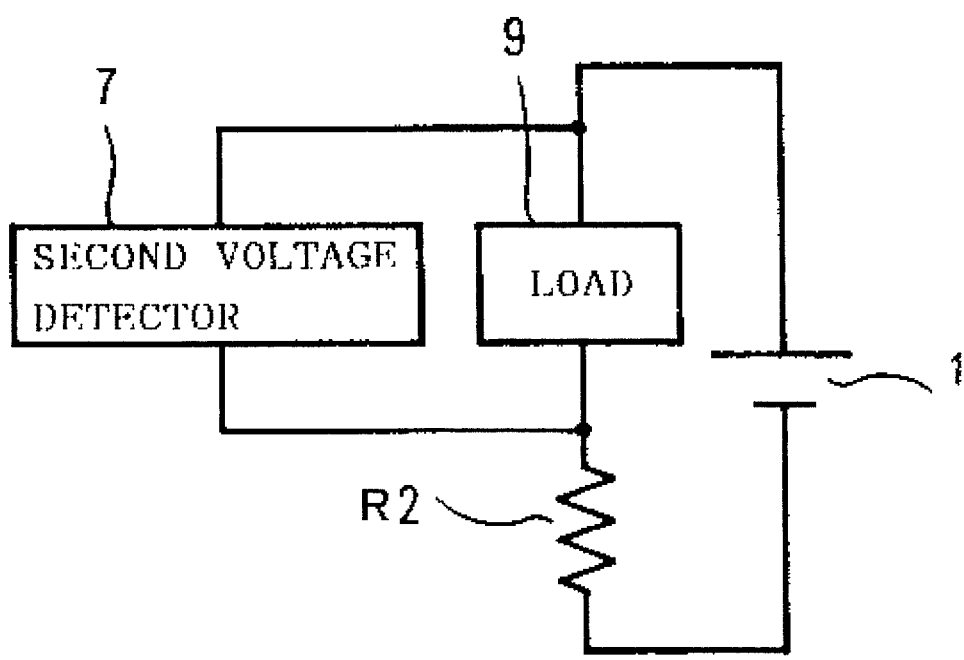
FIG. 2 is a simplified circuit diagram showing operation state in which the switch 5 is closed and the switch 4 is open in the circuit of FIG. 1.

Turning to FIG. 2, the simplified circuit diagram makes this situation easily understood. Since the resistance of the load 9 is much smaller than that of resistor R2, the second voltage detector 7 measures approximately 0 V.

If the resistance of the load 9 increases, the second voltage detector 7 measures a voltage corresponding to the value of the load 9 resistance. In particular, if the load 9 is removed (load resistance becomes infinite), the second voltage detector 7 measures the rechargeable battery voltage. Therefore, when the second voltage detector 7 measures a voltage above a specified value (corresponding to the specified value of rechargeable battery current), the switch control means 8 turns the first switching means 4 on and the second switching means 5 off. In doing this, the rechargeable battery 1 returns to a state capable of normal discharge.

It is emphasized that the over-current protection circuit of the present invention is not limited to discharge of a rechargeable battery as described above, but is also effective as a protection circuit during rechargeable battery charging as well as during non-rechargeable battery discharge.

In an over-current protection circuit with the configuration described above, the first switching means is turned off and the second switching means is turned on by the control means when battery current exceeds the specified value. When battery current drops below the specified value, the first switching means is returned to the on state. This type of circuit is characterized in that the battery is reliably protected against over-current during battery discharge and/or charge.

Figure 3:
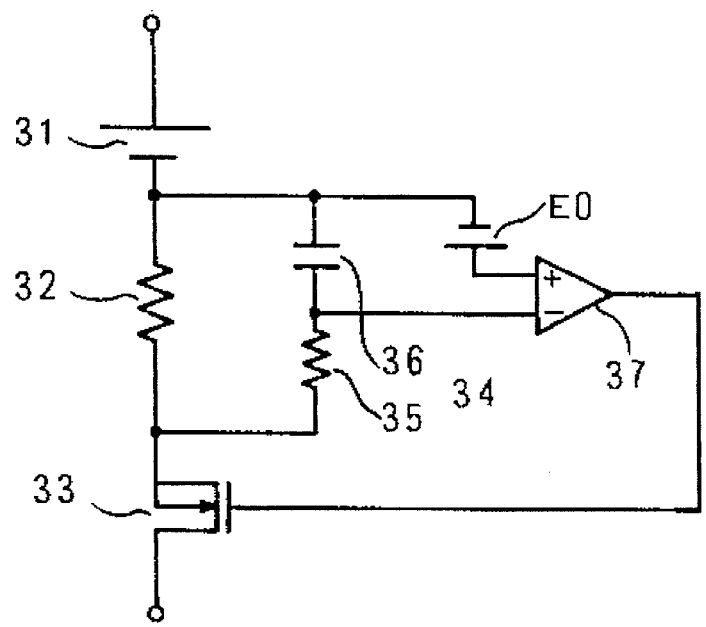
FIGS. 3–9 respectively show examples of the battery over-current protection circuit of the present invention in which a MOSFET is employed as a switch device and a comparator is employed as a switch control device.

Turning to FIG. 3, an over-current protection circuit, that cuts off a switch when over-current flows longer than a set time interval, is shown. This over-current protection circuit does not cut-off the switch for in-rush current that flows only for a brief interval.

FIG. 3 is a circuit diagram of the second embodiment of the present invention. In this figure, 31 is the battery which is either a non-rechargeable battery such as a dry cell or a rechargeable battery such as a lithium ion rechargeable battery, 32 is a current detection means which is low value resistor connected in series with the battery 31 to convert current into voltage, 33 is a switching means which is a MOSFET connected in series with the current detection means 32, 34 is a delay circuit which is comprised of a resistor 35 and capacitor 36 connected in parallel with the current detection means 32, and 37 is a comparator which compares the voltage to which capacitor 36 has been charged with a reference voltage E0 and turns off switching means 33 if the capacitor voltage becomes greater. Together the delay circuit 34 and the comparitor 37 make up the control means.

In the case of battery 31 discharge in this over-current protection circuit, discharge current flows through the current detection means 32 and the delay circuit 34. For normal discharge current, the capacitor 36 charges to a voltage which does not exceed the reference voltage E0. Consequently, the comparator output is a high level signal which maintains the switching means 33 in the on state.

When over-current flows in the battery 31, the capacitor 36 is gradually charged up, and after the set time interval its voltage exceeds the reference voltage E0. This causes the comparator 37 to output a low level signal which turns off the switching means 33 and cuts off battery 31 discharge. When over-current flows in the battery 31 for only a brief interval, the capacitor 36 is not charged to a voltage that exceeds the reference voltage E0. Consequently, the switching means 33 is not turned off.

Figure 4:
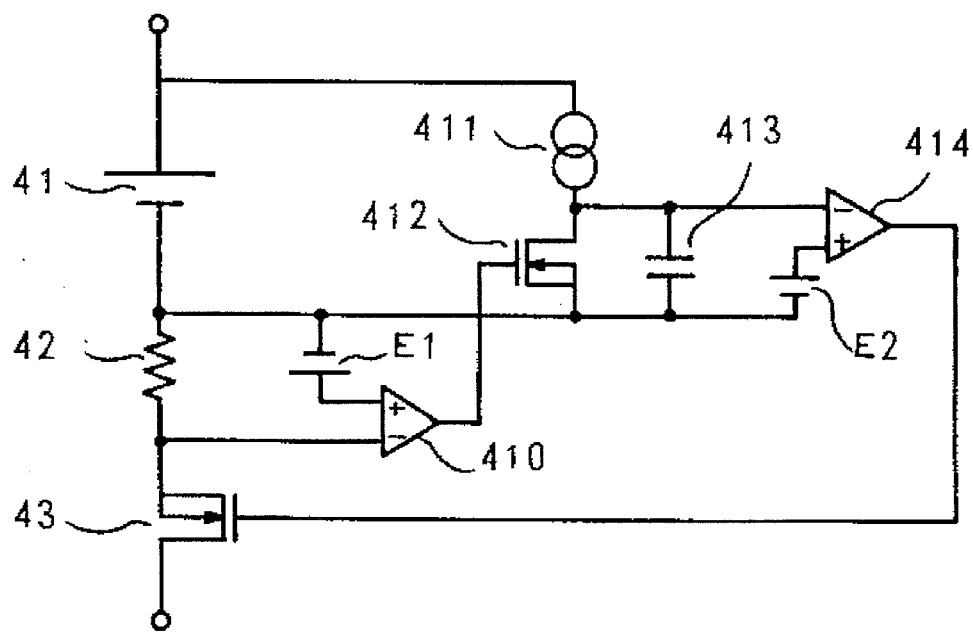

FIG. 4 is a circuit diagram of the third embodiment of the present invention. In this figure, 410 is the first comparator which compares the voltage detected by the current detection means 42 with reference voltage E1, 411 is a current source, and 412 is a MOSFET. The series combination of current source 411 and MOSFET 412 is connected in parallel with the battery 41. The MOSFET 412 is controlled by the output of the first comparator 410. Continuing, 413 is a capacitor connected in parallel with MOSFET 412, and 414 is the second comparator which compares the voltage across capacitor 413 with reference voltage E2 and controls the switching means 43 based on the results.

When normal discharge current flows in the battery 41 of this over-current protection circuit, the output of the first comparator 410 is a high level signal causing the MOSFET 412 to be in the on state preventing the capacitor 413 from charging. Consequently, the output of the second comparator 414 is a high level signal that maintains the switching means 43 in the on state.

When over-current flows in the battery 41, the output of the first comparator 410 becomes a low level signal turning the MOSFET 412 off. This causes constant current charging of the capacitor 413 by the current source 411, and after the set time interval the capacitor voltage exceeds reference voltage E2. When this occurs, the output of the second comparator 414 becomes a low level signal, the switching means 43 is turned off, and battery 41 discharge is cut-off.

When over-current does not flow through the battery 41 for a period longer than the set time interval, the MOSFET 412 switches to the on state before the capacitor 413 voltage builds up to the reference voltage E2. The capacitor 413 then discharges while the second comparator 414 maintains a high level output signal without ever changing to a low level signal. Consequently, the switching means 43 is never turned off.

Figure 5:
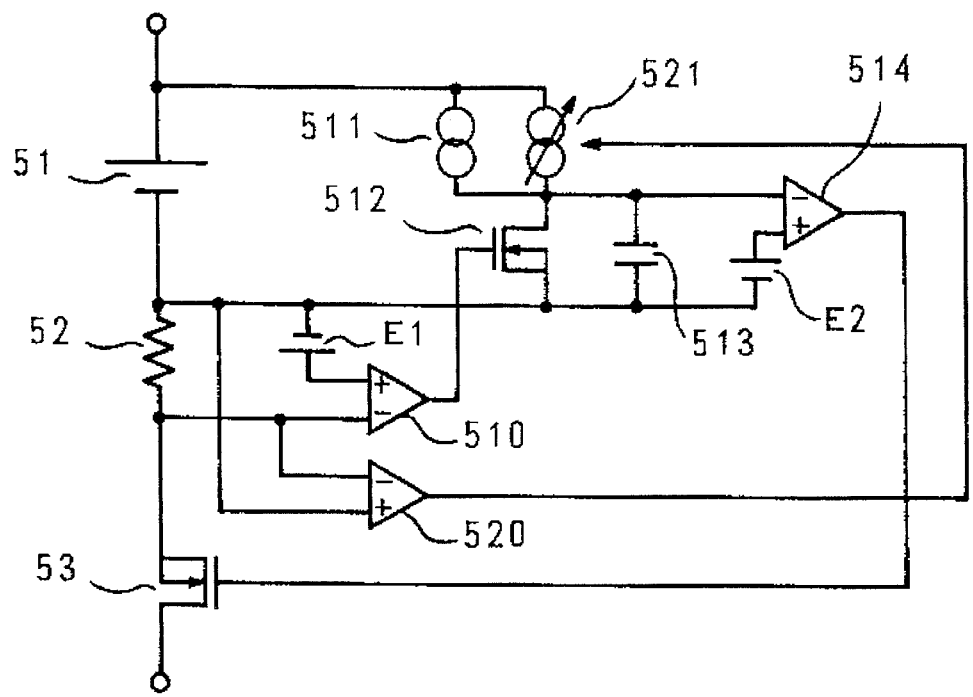

FIG. 5 is a circuit diagram of the fourth embodiment of the present invention. In this figure, 520 is a differential amplifier which measures the voltage across the terminals of the current detection means 52 resistor, and 521 is a voltage controlled current source which produces a fixed current in proportion to the output of the differential amplifier 520 and is connected in parallel with current source 511. Those circuit elements that are the same as the third embodiment of FIG. 4 have the same identification number except for the left-most digit.

When normal discharge current flows in the battery 51 of this over-current protection circuit, the output of the first comparator 510 is a high level signal causing MOSFET 512 to be in the on state preventing capacitor 513 from charging. Consequently, the output of the second comparator 514 is a high level signal that maintains the switching means 53 in the on state.

When over-current flows in the battery 51, the output of the first comparator 510 becomes a low level signal turning the MOSFET 512 off. Consequently, the capacitor 513 is charged with constant current by the current source 511 and the voltage controlled current source 521. At this time, the voltage controlled current source 521 produces a current proportional to the output voltage of the differential amplifier 520. In other words, the larger the battery 51 current, the larger the current source 521 current. Therefore, the time interval required for capacitor 513 to charge up to a voltage exceeding reference voltage E2 is shorter the larger battery current.

When the capacitor 513 charges to a voltage greater than the reference voltage E2, the second comparator 514 output becomes a low level signal, the switching means 53 gets turned off, and battery 51 discharge is cut-off.

In other words, in this embodiment, the greater the battery 51 current, the faster the capacitor 513 is charged and the shorter the time interval before the switching means is turned off.

When over-current flows through the battery 51 but only for a brief interval, the MOSFET 512 switches to the on state discharging capacitor 513 before its voltage builds up to the reference voltage E2. Consequently, the second comparator 514 maintains a high level output signal and the switching means 53 is never turned off.

Figure 6:
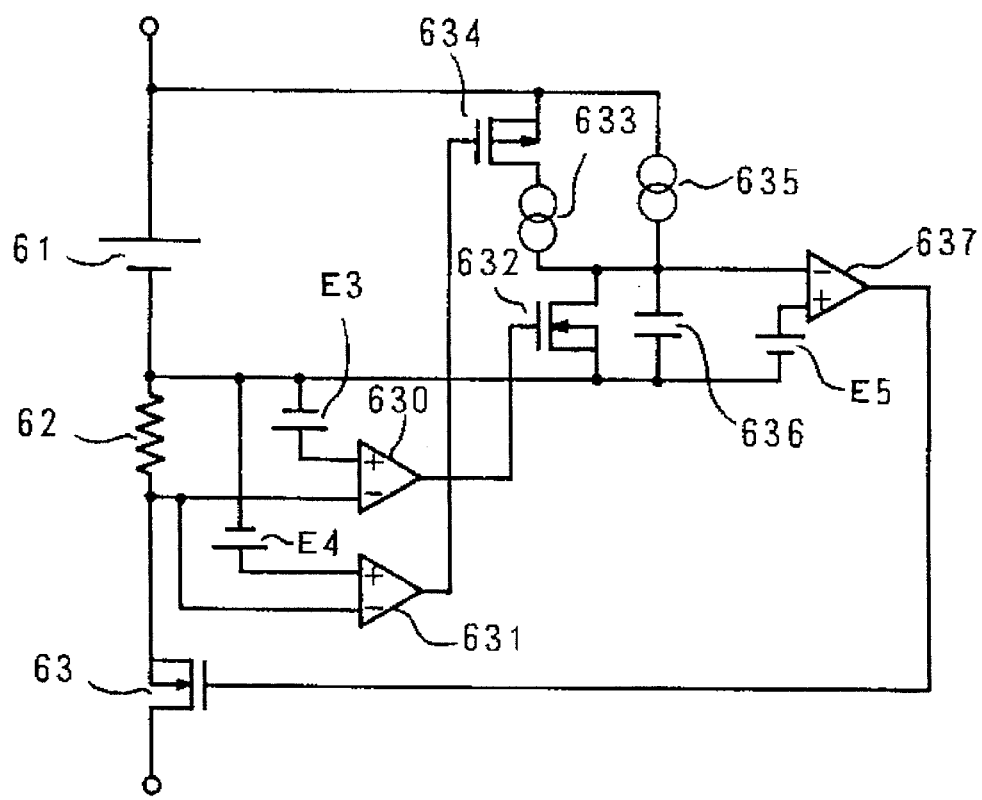

FIG. 6 is a circuit diagram of the fifth embodiment of the present invention. In this figure, 630 is the first comparator which compares the measured value from the current detection means 62 with the first reference voltage E3, 631 is the second comparator which compares the measured value from the current detection means 62 with the second reference voltage E4, 632 is the first MOSFET, 633 is the first current source, and 634 is the second MOSFET. The first MOSFET 632, the first current source 633, and the second MOSFET 634 are connected in series in that order and their combination is connected in parallel with the battery 61. The first MOSFET 632 is a normally off (enhancement mode) FET controlled by the output of the first comparator 630, and the second MOSFET 634 is a normally on (depletion mode) FET controlled by the output of the second comparator 631. Continuing, 635 is the second current source connected in parallel with the series combination of the first current source 633 and the second MOSFET 634, 636 is a capacitor connected in parallel with the first MOSFET 632, and 637 is the third comparator which compares the voltage across capacitor 636 with the third reference voltage E5 and controls the switching means 63 according to the results.

In this over-current protection circuit, the first reference voltage E3 is related to the second reference voltage E4 such that E3<E4. In the following explanation, the first comparator 630 outputs a low level signal when a current of 5 A or more flows, and the second comparator 631 outputs a low level signal when a current of 15 A or more flows.

When normal discharge current (namely, less than 5 A) flows in the battery 61 of this over-current protection circuit, the outputs of both the first comparator 630 and the second comparator 631 are high level signals causing the first MOSFET 632 to be in the on state (and the second MOSFET 634 to be in the off state) preventing capacitor 636 from charging. Consequently, the output of the third comparator 637 is a high level signal that maintains the switching means 53 in the on state.

When more than 5 A but less than 15 A of over-current flows in the battery 61, the output of the first comparator 630 goes low and the first MOSFET 632 turns off. On the other hand, the output of the second comparator 631 remains high and the second MOSFET 634 remains in the off state. Consequently, capacitor 636 is charged by the second current source 635, and after the set time interval, the voltage across capacitor 636 exceeds the third reference voltage E5. This causes the third comparator 637 to output a low signal turning the switching means 63 off and cutting off discharge from the battery 61.

When more than 15 A of over-current flows in the battery 61, the outputs of both the first and second comparators 630, 631 go low, the first MOSFET 632 turns off, and the second MOSFET 634 turns on. Consequently, capacitor 636 is charged by both the first and second current sources 633, 635, and the time interval until the capacitor 636 voltage exceeds the third reference voltage E5 is much shorter than when the capacitor 636 is charged only by the second current source 635. When E5 is exceeded, the third comparator 637 output drops low, the switching means 63 is turned off, and battery 61 discharge is cut-off.

In other words, in this embodiment, depending on the battery 61 current, there are two different set time intervals until the switching means turns off.

In this embodiment as in the previously described embodiments, when over-current flows through the battery 61 for an interval shorter than the set intervals, the first MOSFET 632 switches to the on state discharging capacitor 636 before its voltage builds up to the third reference voltage E5. Consequently, the third comparator 637 maintains a high level output signal and the switching means 63 is never turned off.

In the above embodiments, a resistor is provided as the current detection means to measure battery current. However, by measuring the voltage across the MOSFET used as a switching means, the MOSFET can also serve as the current detection means. In which case, a resistor in unnecessary.

In the over-current protection circuits of FIG. 3 through FIG. 6, the switching means is turned off by the control means when greater than the specified battery current flows for longer than the set time interval. Therefore, there is no unwanted switch cut-off due to in-rush current and the battery is appropriately protected against over-current.

In the following over-current protection circuits, when over-current is detected, the switching means is turned off stopping battery discharge, then after a set time interval, the switching means is automatically turned on. If the over-current condition continues after the set time interval, the switch is again turned off. If the over-current condition is corrected after the set time interval, the switch stays on and the battery returns to a condition capable of discharge.

Figure 7:
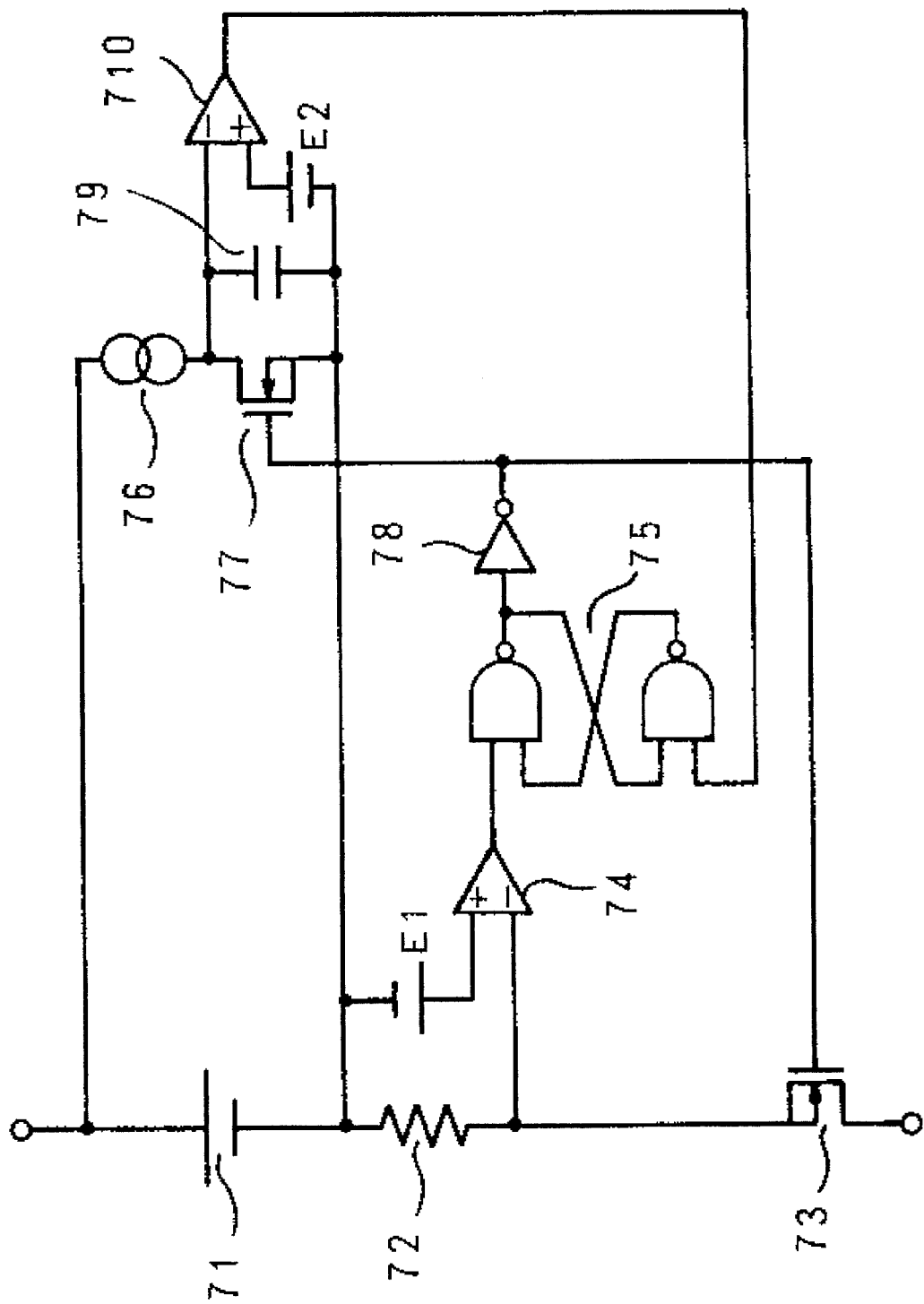

FIG. 7 is a circuit diagram of the sixth embodiment of the present invention. In this figure, 71 is either a rechargeable or non-rechargeable battery, 72 is a current detection means which is low value resistor connected in series with the battery 71, and 73 is a MOSFET switching means connected in series with the current detection means 72.

Continuing, 74 is the first comparator which compares the voltage measured by the current detection means 72 with the reference voltage E1, 75 is a flip-flop (abbreviated FF in the following) which is set based on the output of the first comparator 74, 76 is a current source, and 77 is a MOSFET. The current source 76 and MOSFET 77 are a series combination connected in parallel with the battery 71, and the MOSFET 77 is controlled on or off by the output of the FF 75 connected through an inverter 78. Further, 79 is a capacitor connected in parallel with MOSFET 77, and 710 is the second comparator which compares the voltage across the capacitor 79 with the reference voltage E2 and resets the FF 75 depending on the results of comparison. The first comparator 74 and the second comparator 710 make up the control means to control the switching means 73 on or off depending on the FF 75 output.

When normal discharge current (less than 5 A) flows in the battery 71 of this over-current protection circuit, the output of the first comparator 74 is a high level signal. As a result, the FF 75 is in the reset state and its output is low. Consequently, the MOSFET 77 is on, capacitor 79 is not charged, and the output of the second comparator 710 is high. Therefore, the FF 75 is maintained in the reset state and the switching means 73 is never turned off.

When over-current (for example, more than 5 A) flows in the battery 71, the first comparator 74 output drops low and the FF 75 is set. As a result, the inverter 78 output goes low, MOSFET 77 is turned off, and the switching means 73 is turned off at the same time cutting off battery 71 discharge.

When MOSFET 77 is turned off, capacitor 79 begins charging due to current source 76, and after a set time interval (for example, 0.1 to 10 sec) the capacitor 79 voltage exceeds the reference voltage E2. When this occurs, the second comparator output goes low resetting the FF 75, Therefore, the switching means 73 is turned on and the battery 71 can be discharged.

MOSFET 77 is also switched on discharging capacitor 79, and after a set time interval (for example, within 10 msec), the output of the second comparator 710 goes high.

If the over-current condition persists when the switching means 73 is turned back on, the operation described above for over-current is repeated and the switching means 73 is again turned off cutting off battery 71 discharge. On the other hand, if the over-current condition does not persist, the switching means 73 continues in the on state and battery discharge is possible.

Figure 8:
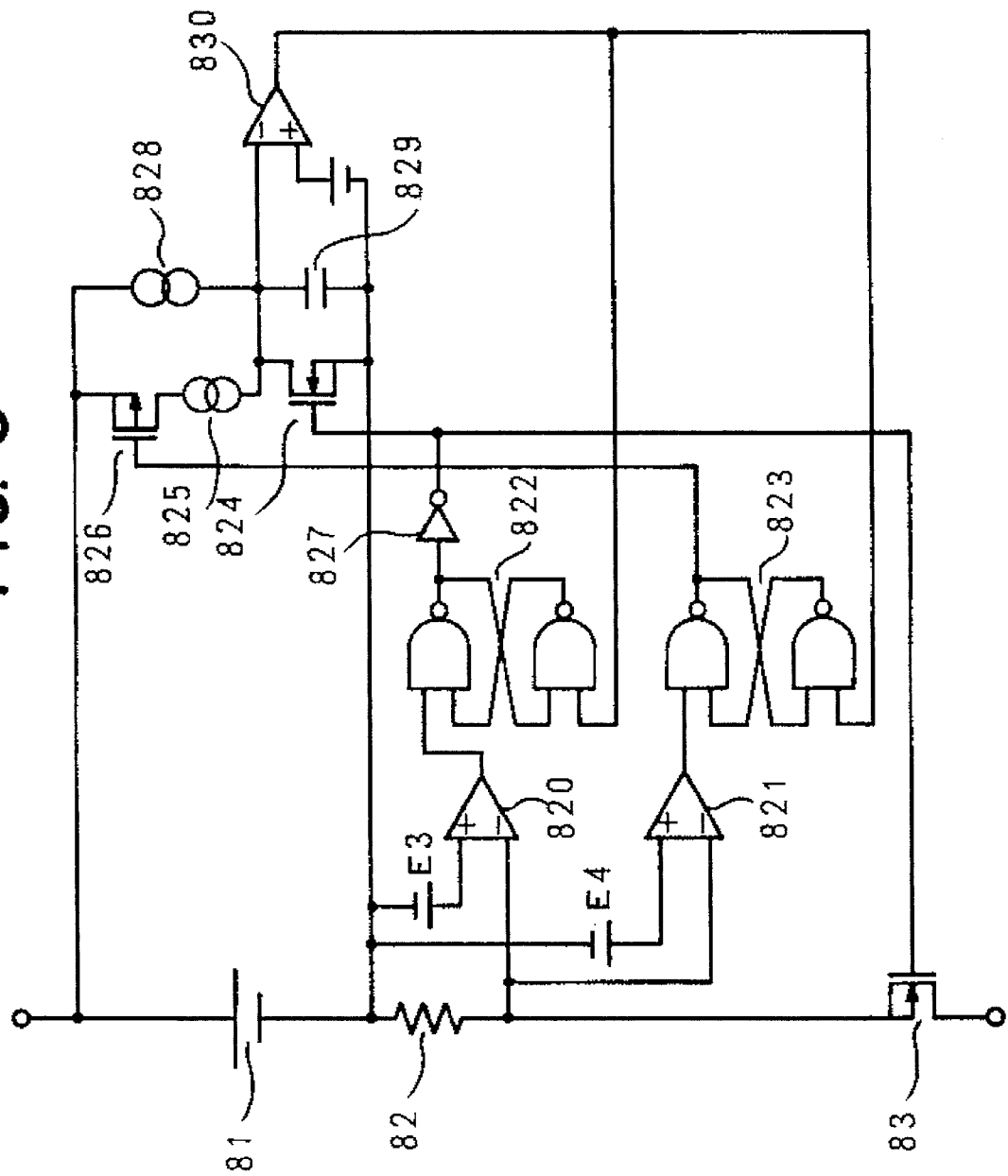

FIG. 8 is a circuit diagram of the seventh embodiment of the present invention. In this figure, 820 is the first comparator which compares the measured value from the current detection means 82 with the first reference voltage E3, 821 is the second comparator which compares the measured value from the current detection means 82 with the second reference voltage E4, and 822 is the first FF which is set based on the output of the first comparator 820. The output of this first FF 822 passes through an inverter 827 to control the switching means 83 on or off. Continuing, 823 is the second FF which is set based on the output of the second comparator 821. 824 is the first MOSFET, 825 is the first current source, and 826 is the second MOSFET. The first MOSFET 824, the first current source 825, and the second MOSFET 826 are series connected in that order and the combination is connected in parallel with the battery 81. The first MOSFET 824 is a normally off (enhancement mode) FET which is controlled on or off by the output of the first FF 822 through inverter 827. The second MOSFET 826 is a normally on (depletion mode) FET which is controlled by the second FF 823.

Further, 828 is the second current source connected in parallel with the series combination of the first current source 825 and the second MOSFET 826, 829 is a capacitor connected in parallel with the first MOSFET 824, and 830 is the third comparator which compares the capacitor 829 voltage with the third reference voltage E5 and resets the first FF 822 and the second FF 823 depending on the comparison results.

In this over-current protection circuit, the first reference voltage E3 is related to the second reference voltage E4 such that E3<E4. For example, the first comparator 820 outputs a low level signal when a current of 5 A or more flows, and the second comparator 821 outputs a low level signal when a current of 10 A or more flows.

When normal discharge current (less than 5 A) flows in the battery 81 of this over-current protection circuit, the outputs of both the first comparator 820 and the second comparator 821 are high level signals which reset both the first FF 822 and the second FF 823. This causes the first MOSFET 824 to be in the on state preventing capacitor 829 from charging. Therefore, the third comparator 830 maintains a high level output, the first and second FF's 822, 823 remain in the reset state, and the switching means 83 continues to be on.

Next, if an over-current greater than 5 A but less than 10 A flows in the battery 81, the output of the first comparator 820 goes low and the first FF 822 is set. This turns the first MOSFET 824 off and at the same time turns off the switching means 83 cutting off battery 81 discharge.

At this time, since the output of the second comparator 821 remains high, the second MOSFET 826 remains in the on state. Consequently, capacitor 829 is rapidly charged by both the first and second current sources 825, 828, and after the set time interval (for example, 0.1 to 5 sec) the capacitor 829 voltage exceeds the third reference voltage E5. This makes the third comparator 830 output drop low to reset the first and second FF's 822, 823 returning to the initial state. Namely, the switching means 83 is turned on and the battery 81 is capable of discharging.

Elsewhere, the first MOSFET 824 also switches on discharging the capacitor 829, and after a set time (for example 10 msec) the output of the third comparator 830 returns high.

In other words, when an over-current greater than 5 A but less than 10 A flows in the battery 81, the switching means 83 shuts off and battery 81 discharge is cut-off. Then after 0.1 to 5 sec, the switching means 83 automatically turns on. At this point, if the over-current condition persists, the switching means 83 again shuts off cutting off battery 81 discharge. Subsequently, the switching means 83 repeatedly turns on and off until the over-current condition has been alleviated. However, when the over-current condition is removed, the switching means 83 remains in the on state allowing battery 81 discharge.

Next, if an over-current of 10 A or more flows in the battery 81, the outputs of both the first and second comparators 820, 821 go low and both the first and second FF's 822, 823 are reset. This turns off both the first and second MOSFET's 824, 826 as well as turning off the switching means 83 to cut-off battery 81 discharge.

Since both the first and second MOSFET's 824, 826 are turned off, after the switching means 83 is shut off, capacitor 829 is slowly charged by only the second current source 828. After the set time interval (for example, 1 to 10 sec), capacitor 829 voltage becomes greater than the third reference voltage E5. Under these conditions, the third comparator 830 output goes low to reset the first and second FF's 822, 823 and return to the initial conditions with the switching means 83 on and the battery 81 capable of discharging.

In other words, when an over-current 10 A or more flows in the battery 81, the switching means 83 is turned off to cut-off battery 81 discharge. Then after 1 to 10 sec have elapsed, the switching means 83 is automatically turned on.

As described above in the seventh embodiment, after the switching means 83 is turned off, depending on the battery 81 current, there are two different set time intervals until the switching means 83 automatically returns to the on state.

Figure 9:
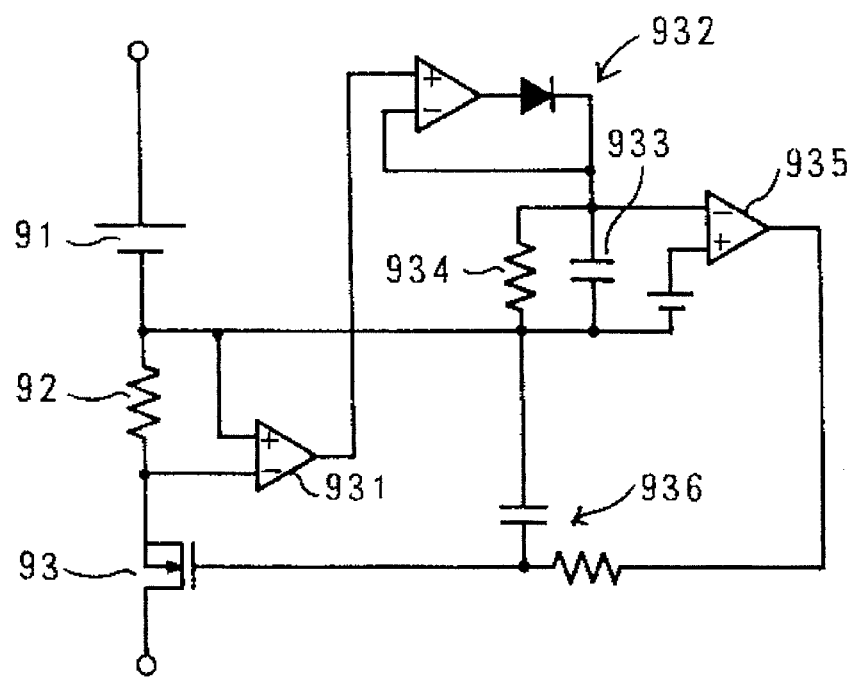

FIG. 9 is a circuit diagram of the eighth embodiment of the present invention. In this figure, 931 is a differential amplifier which amplifies the voltage across the terminals of the current detection means 92, and 932 is a peak-hold circuit which captures the peak value of the differential amplifier 931 output and stores it in capacitor 933. Continuing, 934 is a discharge resistor connected in parallel with capacitor 933, 935 is a comparator which compares the hold value of the peak-hold circuit 932 (namely, the capacitor 933 voltage) with the reference voltage E6, 936 is a delay circuit which delays the comparator 935 output by a set interval (for example, 1 sec) before application to the switching means 93.

When the battery 91 discharges with a normal current of less than 5 A, capacitor 933 does not charge to a voltage that exceeds the reference voltage E6. Consequently, the comparitor 935 maintains a high level output and the switching means 93 continues in the on state.

Figure 10:
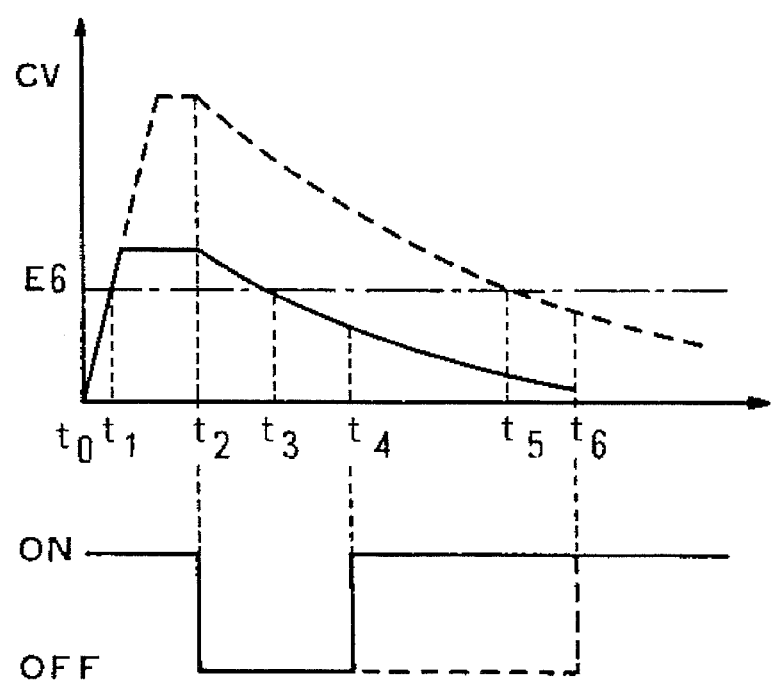
FIG. 10 is a wave-form graph explaining the operation of the circuit shown in FIG. 9.

Next if an over-current of 7 A, for example, flows in the battery 91 from the time labeled t0 in FIG. 10, the capacitor 933 of the peak-hold circuit 932 charges to a voltage Cv which exceeds the reference voltage E6 after time t1, as shown by the solid line in FIG. 10. This causes the comparator 935 output to go low. This low level signal is delayed a set interval (namely from time t1 to t2 in FIG. 10) by the delay circuit 936, and then applied to the switching means 93. This results in turning the switching means 93 off to cut-off battery 91 discharge.

Once the switching means 93 is turned off, capacitor 933 discharges through resistor 934, and by time t3 capacitor 933 voltage Cv has dropped below the reference voltage E6. This causes comparator 935 output to again go high, and again after the set time interval at time t4 (time interval t3 to t4 is equal to time interval t1 to t2) the switching means 93 is returned to the on state.

On the other hand, if an over-current of 10 A flows in the battery 91 from time t0, capacitor 933 voltage Cv (broken line in FIG. 10) exceeds the reference voltage E6 after time t1, comparator 935 output goes low, and the switching means 93 turns off at t2 to cut-off battery 91 discharge in the same manner as described previously.

Again, once the switching means 93 is turned off, capacitor 933 discharges through resistor 934. However, a time t5 longer than t3 is required for capacitor 933 voltage Cv to drop below the reference voltage E6. When this occurs at time t5, comparator 935 output returns to high, and after the previously described set time interval, the switching means 93 returns to the on state at time t6.

In other words, in this eighth embodiment, once the switching means 93 is shut off due to over-current, the time interval until it returns to the on state varies approximately in proportion to the battery 91 over-current.

In the over-current protection circuits described above, when more than the specified current flows through the battery, the switching means is shut off by the control means. These circuits have the feature that after a set time interval from the switching means shut off time, the switching means is automatically returned to the on state. Therefore, the battery is reliably protected and is returned to a state allowing suitable discharge after the over-current discharge condition has been relieved.

What is claimed is:

1. A battery over-current protection circuit comprising:
   (a) a first series circuit of a current detection means for detecting a battery current connected in series with a first switch, said first series circuit for connecting in series with the battery;
   (b) a second series circuit of a resistive element connected in series with a second switch, said second series circuit connected in parallel with said first series circuit; and
   (c) a control means for turning off said first switch and turning on said second switch when the battery current becomes greater than a specified value, and for turning on said first switch when the battery current becomes less than the specified value;
   wherein said control means includes a voltage detector for detecting when the battery current becomes less than the specified value, and wherein said control means is further for switching said first switch on and said second switch off when said voltage detector detects that the battery current has become less than the specified value.

2. A battery over-current protection circuit as recited in claim 1, wherein said control means further includes a switch control means for controlling a switching state of said first and second switches, wherein an output of said current detection means and an output of said voltage detector are input to the switch control means, and wherein said switch control means is for switching said first switch off and said second switch on according to the output from said current detection means, and wherein said switch control means is further for switching said first switch on and said second switch off according to the output from said voltage detector.

3. A battery over-current protection circuit as recited in claim 1, wherein said voltage detector senses a voltage across the terminals of a load connected to the battery.

4. A battery over-current protection circuit as recited in claim 1, wherein said current detection means comprises a low valued resistive element and a voltage detector for detecting a voltage across said low valued resistance element.

5. A battery over-current protection circuit as recited in claim 4, wherein said first switch is a MOSFET and the internal resistance of the MOSFET is used as said low valued resistive element of said current detection means.

6. A battery over-current protection circuit comprising:
   (a) a switch connected in series with the battery;
   (b) a current detection means for detecting a value of a current flowing in the battery;
   (c) a control means for controlling an on and off state of said switch according to the value of the current detected by said current detection means, wherein said control means is for turning off said switch when the value of the current is greater than a specified value and then automatically turning back on said switch upon expiration of a preset time interval from a time when said switch was previously turned off, said preset time interval being approximately proportional to the value of the current.

7. A battery over-current protection circuit comprising:
   (a) a switch connected in series with the battery;
   (b) a current detection means for detecting a value of a current flowing in the battery;
   (c) a control means for controlling an on and off state of said switch according to the value of the current detected by said current detection means, wherein said control means is for turning off said switch when the value of the current is greater than a specified value and then automatically turning back on said switch upon expiration of a preset time interval from a time when said switch was previously turned off;

wherein said control means includes a first comparator which compares an output voltage of said current detection means with a first reference voltage, a flip-flop which is reset by an output of said first comparator, a capacitor which is discharged by an output of said flip-flop, a current source which charges said capacitor, and a second comparator which compares a voltage of said capacitor with a second reference voltage.

* * * * *